(12) United States Patent
Pan et al.

(10) Patent No.: US 11,874,425 B2
(45) Date of Patent: Jan. 16, 2024

(54) COMPOUND SIGNAL FOR LOGGING WHILE DRILLING RESISTIVITY INVERSION

(71) Applicant: Halliburton Energy Services, Inc., Houston, TX (US)

(72) Inventors: Li Pan, Singapore (CN); Hsu-Hsiang Wu, Houston, TX (US); Yi Jing Fan, Singapore (CN); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 189 days.

(21) Appl. No.: 17/522,631

(22) Filed: Nov. 9, 2021

(65) Prior Publication Data
US 2023/0145563 A1    May 11, 2023

(51) Int. Cl.
*G01V 3/28* (2006.01)
*E21B 47/13* (2012.01)

(52) U.S. Cl.
CPC .............. *G01V 3/28* (2013.01); *E21B 47/13* (2020.05)

(58) Field of Classification Search
CPC .................................. G01B 3/28; E21B 47/13
See application file for complete search history.

(56) References Cited

U.S. PATENT DOCUMENTS

| | | |
|---|---|---|
| 2015/0240629 A1 | 8/2015 | Wu et al. |
| 2015/0309201 A1 | 10/2015 | Wu et al. |
| 2015/0322774 A1 | 11/2015 | Wu et al. |
| 2016/0003963 A1* | 1/2016 | Kouchmeshky ......... G01V 3/28 702/7 |
| 2018/0003853 A1 | 1/2018 | Ewe et al. |
| 2018/0371893 A1 | 12/2018 | Ma et al. |
| 2019/0383961 A1 | 12/2019 | Dong et al. |
| 2020/0096665 A1 | 3/2020 | Wu et al. |
| 2020/0270982 A1 | 8/2020 | Pan et al. |
| 2020/0309984 A1 | 10/2020 | Pan et al. |
| 2020/0378247 A1 | 12/2020 | Ma et al. |
| 2021/0055447 A1 | 2/2021 | Dong et al. |
| 2021/0132251 A1 | 5/2021 | Dong et al. |
| 2021/0278562 A1 | 9/2021 | Wu et al. |

* cited by examiner

*Primary Examiner* — Minh Q Phan
(74) *Attorney, Agent, or Firm* — Benjamin Ford; C. Tumey Law Group, PLLC

(57) ABSTRACT

A method and system for identifying a blind spot in one or more decoupled measurements. The method may comprise disposing an electromagnetic well measurement system into a wellbore. The electromagnetic well measurement system comprise an electromagnetic transmitter and a plurality of electromagnetic receivers. The method may further comprise transmitting electromagnetic fields into a formation with the electromagnetic transmitter, measuring the electromagnetic fields with the plurality of electromagnetic receivers as one or more measurements at one or more depths in the wellbore, decoupling the one or more measurements to form decoupled measurements, identifying if a blind spot is in the decoupled measurements, and performing an inversion with the decoupled measurements.

20 Claims, 6 Drawing Sheets

COMPOUND SIGNAL FOR LOGGING WHILE DRILLING RESISTIVITY INVERSION

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. Formation evaluation further from a wellbore is a critical step in reservoir characterization and monitoring. Logging tools typically measure the "near-field", or in the proximity of the wellbore. Logging tools are evolving to measure the "far-field", or large distances from the wellbore.

Logging tools may obtain geophysical and/or logging measurements for formation evaluation and monitoring. The geophysical and/or logging measurements may be altered through mathematical schemes, such as an inversion scheme, to determine formation characteristics. Currently, logging tools may suffer from an azimuth angle blind spot. A blind spot is a mathematical singularity that prevents existing processing concepts from decoupling individual value of the multi-component signals (i.e., XX, YY, ZZ, etc.). However, tool azimuthal measurements still have sensitivity to all multi-component signals, but the formulas become linearly dependent to each other at the blind spot azimuth angle, and therefore the individual vale of XX, YY or ZZ cannot be determined based on current techniques.

BRIEF DESCRIPTION OF THE DRAWINGS

These drawings illustrate certain aspects of some examples of the present disclosure and should not be used to limit or define the disclosure.

DETAILED DESCRIPTION

The present application is directed to subterranean operations and, more particularly, to methods and systems for well logging that use electromagnetic resistivity logging tools. As noted above, current logging tools may experience a "blind spot," which may not allow for individual values of XX, YY, and ZZ to be solved. However, discussed below are methods and systems that may allow for the use of one or more compound signals. The compound signals may have mixed combinations of their three components without solving for an individual value.

Figure 1:
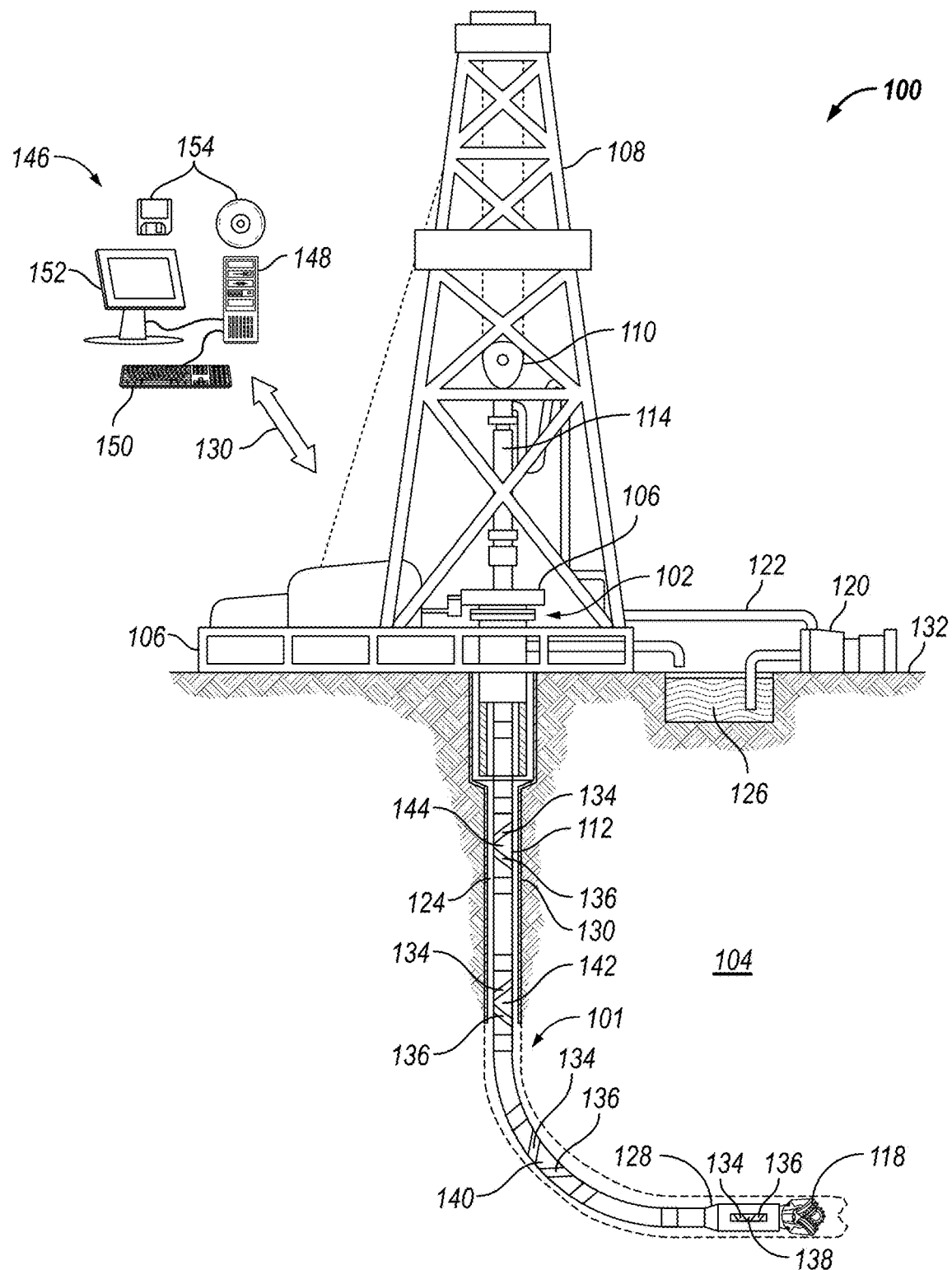
FIG. 1 illustrates an example of an electromagnetic well measurement system.

FIG. 1 illustrates a drilling system 100. As illustrated, drilling system 100 may include a drilling platform 106 may support a derrick 108 having a traveling block 110 for raising and lowering drill string 112. Drill string 112 may include, but is not limited to, drill pipe and coiled tubing, as generally known to those skilled in the art. A kelly 114 may support drill string 112 as it may be lowered through a rotary table 116. A drill bit 1218 may be attached to the distal end of drill string 112 and may be driven either by a downhole motor and/or via rotation of drill string 112 from surface 132. Without limitation, drill bit 118 may include, roller cone bits, PDC bits, natural diamond bits, any hole openers, reamers, coring bits, and the like. As drill bit 118 rotates, it may create and extend wellbore 101 that penetrates various subterranean formations 104.

Generally, wellbore 101 may include horizontal, vertical, slanted, curved, and other types of wellbore geometries and orientations. Wellbore 101 may be cased or uncased. In examples, wellbore 101 may include a metallic material. By way of example, the metallic member may be a casing, liner, tubing, or other elongated steel tubular disposed in wellbore 101.

As illustrated, wellbore 101 may extend through subterranean formation 104. As illustrated in FIG. 1, wellbore 101 may extending generally vertically into the subterranean formation 104, however wellbore 101 may extend at an angle through subterranean formation 104, such as horizontal and slanted wellbores. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

With continued reference to FIG. 1, a pump 120 may circulate drilling fluid through a feed pipe 122 to kelly 114, downhole through interior of drill string 112, through orifices in drill bit 118, back to surface 132 via annulus 124 surrounding drill string 112, and into a retention pit 126. Drill string 112 may begin at wellhead 102 and may traverse wellbore 101. Drill bit 118 may be attached to a distal end of drill string 112 and may be driven, for example, either by a downhole motor and/or via rotation of drill string 112 from surface 132. Drill bit 118 may be a part of bottom hole assembly 128 at distal end of drill string 112.

Drilling system 100 may include one or more electromagnetic induction tools, which may be used in a number of downhole induction tools operations, such as measuring-while-drilling (MWD), logging-while-drilling (LWD), wireline logging, and permanent monitoring operations. In examples, without limitation, tubulars may be disposed within the drill collar on a bottom hole assembly, a wireline tool mandrel, and/or permanently installed production casing. For brevity, the metallic tubular may be referred to as a downhole tool below. The electromagnetic antenna in the electromagnetic induction tool may be a magnetometer and/or an induction coil, which may reside on the downhole tool and/or outside. In examples, an electromagnetic source may be an electromagnetic antenna, which may be energized to produce an electromagnetic field. Where used, either the electromagnetic antenna and/or electromagnetic source may reside on the bottom hole assembly and/or outside, even on the surface.

Electromagnetic antennae may record voltages from electromagnetic fields induced by the electromagnetic source. Depending on details of the electromagnetic antenna's design and the size of the computation domain (i.e., mandrel and wellbore lengths) included in an inversion computation, it may take hours to a matter of days to fully compute recorded data from electromagnetic antenna(s). Without limitation, operations that may compute electric and/or magnetic fields may determine the distance and inclination of target well in ranging applications, bed resistivity and distances to bed boundaries in resistivity application, as well as distance to oil-water interface and resistivity change in waterflood monitoring application. Computation of the inversion may include a list of unknown parameters and the accuracy of these parameters may depend on the accuracy of a forward model. Forward models may include full-wave methods which may capture a mandrel (i.e., the supporting structured of the downhole tool) and the wellbore effect accurately.

Electromagnetic well measurement system may include a first downhole tool 138, a second downhole tool 140, a third downhole tool 142, and/or a fourth downhole tool 144 disposed on a conveyance, which may be lowered into wellbore 101. In examples, each downhole tool may be separated by about 1 foot (0.3 meter) to about 100 feet (30 meters), about twenty feet (6.096 meters) to about 200 feet (61 meters), or about 50 feet (15 meters) to about 100 (30 meters). It should be noted that electromagnetic well measurement system 100 may include first downhole tool 138. may include an electromagnetic induction tools may be used in a number of downhole induction tools operations, such as measuring-while-drilling (MWD), logging-while-drilling (LWD), wireline logging, and permanent monitoring operations. In examples, without limitation, tubulars may be disposed within the drill collar on a bottom hole assembly, a wireline tool mandrel, and/or permanently installed production casing. For brevity, the metallic tubular may be referred to as a downhole tool below. The electromagnetic antenna in the electromagnetic induction tool may be a magnetometer and/or an induction coil, which may reside on the downhole tool and/or outside. In examples, an electromagnetic source may be an electromagnetic antenna, which may be energized to produce an electromagnetic field. Where used, either the electromagnetic antenna and/or electromagnetic source may reside on the bottom hole assembly and/or outside, even on the surface.

Electromagnetic antennae may record voltages from electromagnetic fields induced by the electromagnetic source. Depending on details of the electromagnetic antenna's design and the size of the computation domain (i.e., mandrel and wellbore lengths) included in an inversion computation, it may take hours to a matter of days to fully compute recorded data from electromagnetic antenna(s). Without limitation, operations that may compute electric and/or magnetic fields may determine the distance and inclination of target well in ranging applications, bed resistivity and distances to bed boundaries in resistivity application, as well as distance to oil-water interface and resistivity change in waterflood monitoring application. Computation of the inversion may include a list of unknown parameters and the accuracy of these parameters may depend on the accuracy of a forward model. Forward models may include full-wave methods which may capture a mandrel (i.e., the supporting structured of the downhole tool) and the wellbore effect accurately.

With continued reference to FIG. 1, bottom hole assembly 128 may further include first downhole tool 138. First downhole tool 138 may be disposed on the outside and/or within bottom hole assembly 128. It should be noted that second downhole tool 140, third downhole tool 142, and/or fourth downhole tool 144 may be disposed on drill string 112. Second downhole tool 140, third downhole tool 142, and/or fourth downhole tool 144 may be disposed on the outside and/or within drill string 112. First downhole tool 138, second downhole tool 140, third downhole tool 142, and/or fourth downhole tool 144 may include an electromagnetic transmitter 134 and/or an electromagnetic receiver 136. It should be noted that first downhole tool 138, second downhole tool 140, third downhole tool 142, and/or fourth downhole tool 144 may include a plurality of electromagnetic transmitters 134 and/or electromagnetic receivers 136. Electromagnetic transmitters 134 and/or electromagnetic receivers 136 may operate and/or function as electromagnetic antenna, described above. It should be noted that both electromagnetic transmitters 135 and/or electromagnetic receiver 146 may be referred to as antenna. As will be appreciated by those of ordinary skill in the art, first downhole tool 138, second downhole tool 140, third downhole tool 142, and/or fourth downhole tool 144 may be a measurement-while drilling (MWD) or logging-while-drilling (LWD) system.

Without limitation, first downhole tool 138, second downhole tool 140, third downhole tool 142, and/or fourth downhole tool 144, electromagnetic transmitters 134, and/or electromagnetic receiver 136 may be connected to and/or controlled by information handling system 146, which may be disposed on surface 132.

Systems and methods of the present disclosure may be implemented, at least in part, with information handling system 146. Information handling system 146 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 146 may be a personal computer, two or more computers working in a network, a network storage device, or any other suitable device and may vary in size, shape, performance, functionality, and price. Information handling system 146 may include random access memory (RAM), one or more processing resources such as a central processing unit (CPU) 148 or hardware or software control logic, ROM, and/or other types of nonvolatile memory. Additional components of the information handling system 146 may include one or more disk drives, one or more network ports for communication with external devices as well as an input device 150 (e.g., keyboard, mouse, etc.) and output devices, such as a video display 152. Information handling system 146 may also include one or more buses operable to transmit communications between the various hardware components.

Alternatively, systems and methods of the present disclosure may be implemented, at least in part, with non-transitory computer-readable media 154. Non-transitory computer-readable media 154 may include any instrumentality or aggregation of instrumentalities that may retain data and/or instructions for a period of time. Non-transitory computer-readable media 154 may include, for example, storage media such as a direct access storage device (e.g., a hard disk drive or floppy disk drive), a sequential access storage device (e.g., a tape disk drive), compact disk, CD-ROM, DVD, RAM, ROM, and electrically erasable programmable read-only memory (EEPROM), and/or flash memory. In examples, communications media may be used to move information from one non-transitory computer-readable media 154 to another. Communications media may comprise wires, optical fibers, microwaves, radio waves, and other electromagnetic and/or optical carriers; and/or any combination of the foregoing.

Without limitation, information handling system 146 may be disposed downhole in first downhole tool 138, second downhole tool 140, third downhole tool 142, and/or fourth downhole tool 144. Processing of information recorded may occur downhole and/or on surface 132. Processing occurring downhole may be transmitted to surface 132 to be recorded, observed, and/or further analyzed. Additionally, information recorded on information handling system 146 that may be disposed downhole may be stored until first downhole tool 138, second downhole tool 140, third downhole tool 142, and/or fourth downhole tool 144 may be brought to surface 132. In examples, information handling system 146 may communicate with first downhole tool 138, second downhole tool 140, third downhole tool 142, and/or fourth downhole tool 144 through a communication line (not illustrated) disposed in (or on) drill string 112. In examples, wireless communication may be used to transmit information back and forth between information handling system 146 and first downhole tool 138, second downhole tool 140, third downhole tool 142, and/or fourth downhole tool 144. Information handling system 146 may transmit information to first downhole tool 138, second downhole tool 140, third downhole tool 142, and/or fourth downhole tool 144 and may receive as well as process information recorded by first downhole tool 138, second downhole tool 140, third downhole tool 142, and/or fourth downhole tool 144. In examples, a downhole information handling system (not illustrated) may include, without limitation, a microprocessor or other suitable circuitry, for estimating, receiving and processing signals from first downhole tool 138, second downhole tool 140, third downhole tool 142, and/or fourth downhole tool 144. Downhole information handling system (not illustrated) may further include additional components, such as memory, input/output devices, interfaces, and the like. In examples, while not illustrated, first downhole tool 138, second downhole tool 140, third downhole tool 142, and/or fourth downhole tool 144 may include one or more additional components, such as analog-to-digital converter, filter and amplifier, among others, that may be used to process the measurements of first downhole tool 138, second downhole tool 140, third downhole tool 142, and/or fourth downhole tool 144 before they may be transmitted to surface 132. Alternatively, raw measurements from first downhole tool 138, second downhole tool 140, third downhole tool 142, and/or fourth downhole tool 144 may be transmitted to surface 132.

Any suitable technique may be used for transmitting signals from first downhole tool 138, second downhole tool 140, third downhole tool 142, and/or fourth downhole tool 144 to surface 132, including, but not limited to, wired pipe telemetry, mud-pulse telemetry, acoustic telemetry, and electromagnetic telemetry. While not illustrated, first downhole tool 138, second downhole tool 140, third downhole tool 142, and/or fourth downhole tool 144 may include a telemetry subassembly that may transmit telemetry data to surface 132. Without limitation, an electromagnetic source in the telemetry subassembly may be operable to generate pressure pulses in the drilling fluid that propagate along the fluid stream to surface 132. At surface 132, pressure transducers (not shown) may convert the pressure signal into electrical signals for a digitizer (not illustrated). The digitizer may supply a digital form of the telemetry signals to information handling system 146 via a communication link 130, which may be a wired or wireless link. The telemetry data may be analyzed and processed by information handling system 146.

As illustrated, communication link 130 (which may be wired or wireless, for example) may be provided that may transmit data from first downhole tool 138, second downhole tool 140, third downhole tool 142, and/or fourth downhole tool 144 to an information handling system 146 at surface 132. Information handling system 146 may include a central processing unit 148, a video display 152, an input device 150 (e.g., keyboard, mouse, etc.), and/or non-transitory computer-readable media 154 (e.g., optical disks, magnetic disks) that may store code representative of the methods described herein. In addition to, or in place of processing at surface 132, processing may occur downhole.

First downhole tool 138, second downhole tool 140, third downhole tool 142, and/or fourth downhole tool 144 may include an electromagnetic transmitter 134 and/or an electromagnetic receiver 136. In examples, first downhole tool 138, second downhole tool 140, third downhole tool 142, and/or fourth downhole tool 144 may operate with additional equipment (not illustrated) on surface 132 and/or disposed in a separate electromagnetic well measurement system (not illustrated) to record measurements and/or values from subterranean formation 104. During operations, electromagnetic transmitter 134 may broadcast an electromagnetic field from first downhole tool 138, second downhole tool 140, third downhole tool 142, and/or fourth downhole tool 144. Electromagnetic transmitter 134 may be connected to information handling system 146, which may further control the function and/or operation of electromagnetic transmitter 134. Additionally, electromagnetic receiver 136 may sense, measure, and/or record electromagnetic fields broadcasted from electromagnetic transmitter 134. Electromagnetic receiver 136 may transfer recorded information to information handling system 146. Information handling system 146 may control the operation of electromagnetic receiver 136. For example, the broadcasted electromagnetic field from electromagnetic transmitter 134 may be altered (i.e., in phase and attenuation, and/or the like) by subterranean formation 104. The altered electromagnetic field may be recorded by electromagnetic receiver 136 and may be transferred to information handling system 146 for further processing. In examples, there may be any suitable number of electromagnetic transmitters 134 and/or electromagnetic receivers 136, which may be controlled by information handling system 146. Information and/or measurements may be processed further by information handling system 146 to determine properties of wellbore 101, fluids, and/or subterranean formation 104.

Figure 2:
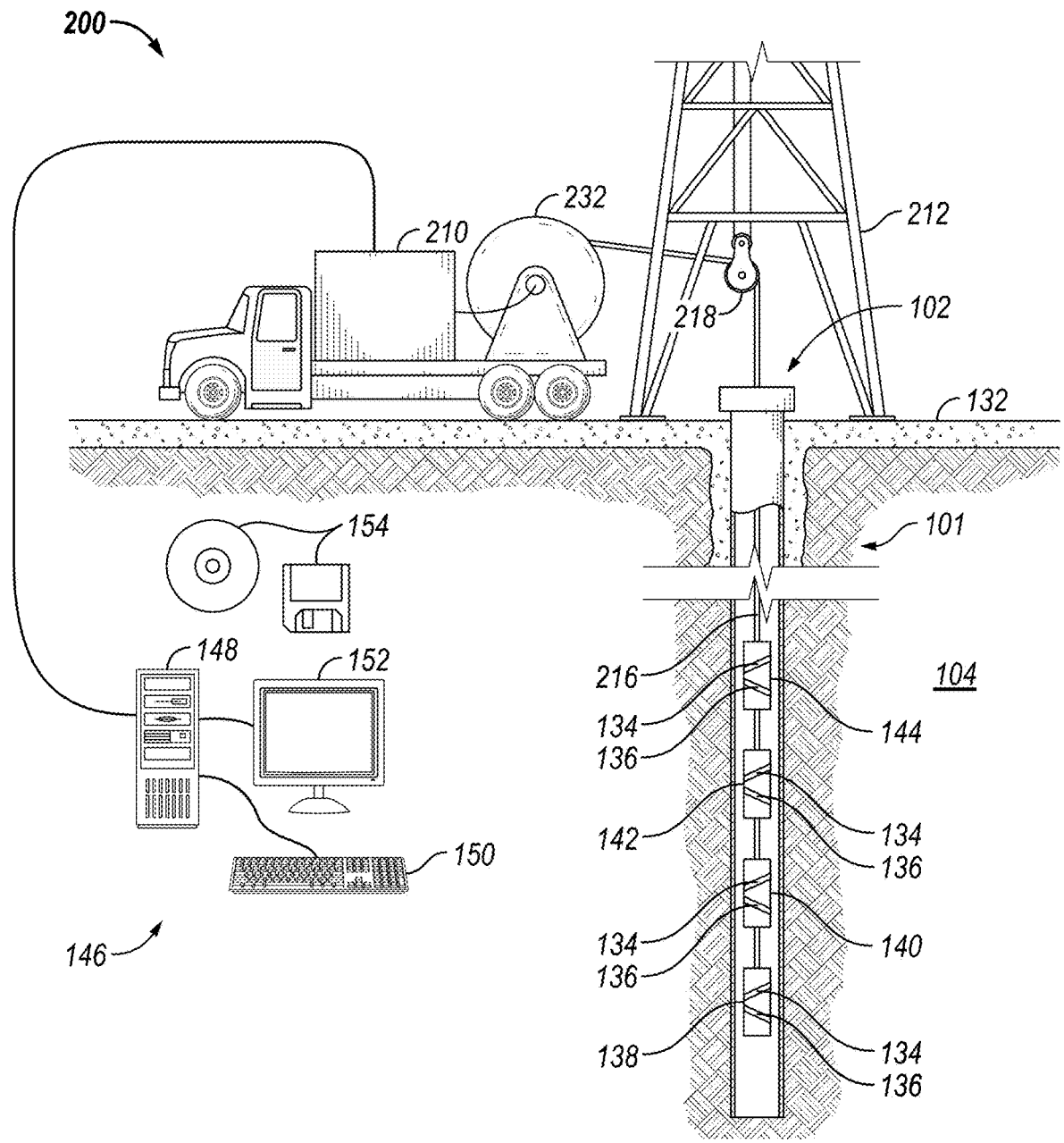
FIG. 2 illustrates another example of an electromagnetic well measurement system.

FIG. 2 illustrates a cross-sectional view of an electromagnetic well measurement system 200 which may be disposed in a wellbore 101. As illustrated, wellbore 101 may extend from a wellhead 102 into a subterranean formation 104 from surface 132. As illustrated, electromagnetic well measurement system 100 may include a plurality of downhole electromagnetic tools, such as first downhole tool 138. As illustrated, first downhole tool 138, second downhole tool 140, third downhole tool 142, and/or fourth downhole tool 144 may attach to a vehicle 210. In examples, it should be noted that first downhole tool 138, second downhole tool 140, third downhole tool 142, and/or fourth downhole tool 144 may not be attached to a vehicle 210. First downhole tool 138, second downhole tool 140, third downhole tool 142, and/or fourth downhole tool 144 may be supported by rig 212 at surface 132. First downhole tool 138, second downhole tool 140, third downhole tool 142, and/or fourth downhole tool 144 may be tethered to vehicle 210 through conveyance 216. Conveyance 216 may be disposed around one or more sheave wheels 218 to vehicle 210. Conveyance 216 may include any suitable means for providing mechanical conveyance for first downhole tool 138, second downhole tool 140, third downhole tool 142, and/or fourth downhole tool 144, including, but not limited to, wireline, slickline, coiled tubing, pipe, drill pipe, downhole tractor, or the like. In some embodiments, conveyance 216 may provide mechanical suspension, as well as electrical connectivity, for first downhole tool 138, second downhole tool 140, third downhole tool 142, and/or fourth downhole tool 144. Conveyance 216 may include, in some instances, a plurality of electrical conductors extending from vehicle 210. Conveyance 216 may include an inner core of several electrical conductors covered by an insulating wrap. An inner and outer steel armor sheath may be wrapped in a helix in opposite directions around the conductors. The electrical conductors may be used for communicating power and telemetry between vehicle 210 and first downhole tool 138, second downhole tool 140, third downhole tool 142, and/or fourth downhole tool 144. Information from first downhole tool 138, second downhole tool 140, third downhole tool 142, and/or fourth downhole tool 144 may be gathered and/or processed by information handling system 146. For example, signals recorded by first downhole tool 138, second downhole tool 140, third downhole tool 142, and/or fourth downhole tool 144 may be stored on memory and then processed by first downhole tool 138, second downhole tool 140, third downhole tool 142, and/or fourth downhole tool 144. The processing may be performed real-time during data acquisition or after recovery of first downhole tool 138, second downhole tool 140, third downhole tool 142, and/or fourth downhole tool 144. Processing may alternatively occur downhole or may occur both downhole and at surface. In some embodiments, signals recorded by first downhole tool 138, second downhole tool 140, third downhole tool 142, and/or fourth downhole tool 144 may be conducted to information handling system 146 by way of conveyance 216. Information handling system 146 may process the signals, and the information contained therein may be displayed for an operator to observe and stored for future processing and reference. Information handling system 146 may also contain an apparatus for supplying control signals and power to first downhole tool 138, second downhole tool 140, third downhole tool 142, and/or fourth downhole tool 144.

In examples, rig 212 includes a load cell (not shown) which may determine the amount of pull on conveyance 216 at the surface of wellbore 101. Information handling system 146 may include a safety valve which controls the hydraulic pressure that drives drum 232 on vehicle 210 which may reel up and/or release conveyance 216 which may move first downhole tool 138, second downhole tool 140, third downhole tool 142, and/or fourth downhole tool 144 up and/or down wellbore 101. The safety valve may be adjusted to a pressure such that drum 232 may only impart a small amount of tension to conveyance 216 over and above the tension necessary to retrieve conveyance 216 and/or first downhole tool 138, second downhole tool 140, third downhole tool 142, and/or fourth downhole tool 144 from wellbore 101. The safety valve is typically set a few hundred pounds above the amount of desired safe pull on conveyance 216 such that once that limit is exceeded; further pull on conveyance 216 may be prevented.

In examples, first downhole tool 138, second downhole tool 140, third downhole tool 142, and/or fourth downhole tool 144 may include an electromagnetic transmitter 134 and/or an electromagnetic receiver 136. It should be noted each downhole tool may include a plurality of electromagnetic transmitters 134 and/or a plurality of electromagnetic receivers 136. The plurality of electromagnetic transmitters 134 and the plurality of electromagnetic receiver 136 may be disposed along a longitudinal axis of any downhole tool. As disclosed, the concepts that are described herein are valid for any type of electromagnetic transmitters 134 and electromagnetic receiver 136. As an example, wire antenna, toroidal antenna and/or azimuthal button electrodes, electromagnetic transmitter coils, and/or electromagnetic receiver coils may also be used in the place of the electromagnetic transmitters 134 and/or electromagnetic receiver 136. In some examples, electromagnetic receiver 136 may include an electromagnetic transmitter, an electromagnetic receiver, or a transceiver. Without limitation, electromagnetic transmitters 134 and/or electromagnetic receiver 136 may be disposed on and/or adjacent to a gap sub. In examples, there may be more than one gap sub in which electromagnetic transmitters 134 and/or electromagnetic receiver 136 may be disposed on and/or adjacent to.

Additionally, electromagnetic transmitter 134 may operate and function to broadcast an electromagnetic field. In examples, electromagnetic transmitter 134 ma broadcast a low frequency electromagnetic field and/or a high frequency electromagnetic field. A low frequency electromagnetic field, wherein the low frequency electromagnetic field may range from about 1 KHz to about 250 KHz. Electromagnetic transmitter 134 may also broadcast a high frequency electromagnetic field, which may range from about 250 KHz to about 2 MHz. Electromagnetic transmitter 134 may broadcast the high frequency electromagnetic field and the low frequency electromagnetic field on any number of frequencies along any number of channels sequentially and/or simultaneously on the same antenna and/or multiple antennas. In examples, first downhole tool 138, second downhole tool 140, third downhole tool 142, and/or fourth downhole tool 144 may operate with additional equipment (not illustrated) on surface 132 and/or disposed in a separate electromagnetic well measurement system (not illustrated) to record measurements and/or values from formation 105. During operations, electromagnetic transmitter 134 may broadcast the high frequency electromagnetic field or the low frequency electromagnetic field from first downhole tool 138, second downhole tool 140, third downhole tool 142, and/or fourth downhole tool 144. Electromagnetic transmitter 134 may be connected to information handling system 146, which may further control the function and/or operation of electromagnetic transmitter 134. Additionally, electromagnetic receiver 136 may measure and/or record electromagnetic fields broadcasted from electromagnetic transmitter 134. Electromagnetic receiver 136 may transfer recorded information to information handling system 146. Information handling system 146 may control the operation of electromagnetic receiver 136. For example, the broadcasted electromagnetic field from electromagnetic transmitter 134 may be altered (i.e., in phase and attenuation, and/or the like) by formation 105, which may be sensed, measured, and/or recorded by electromagnetic receiver 136. It should be noted that electromagnetic transmitter 134 and electromagnetic receiver 136 may be the same antenna, coil, toroid, and/or the like. The recorded signal may be transferred to information handling system 146 for further processing.

In examples, there may be any suitable number of electromagnetic transmitters 134 and/or electromagnetic receivers 136, which may be controlled by information handling system 146. Information and/or measurements may be processed further by information handling system 146 to determine properties of wellbore 101, fluids, and/or formation 104.

During electromagnetic logging operations, deep electromagnetic measurements, which may be found using low frequency electromagnetic fields, may be fed into an inversion together with shallow measurements, which may be found using high frequency electromagnetic fields. The inversion may produce a formation resistivity model. Without limitations, deep electromagnetic measurements may be measurements that may be able to measure formation properties that are more than 100 feet (30 meters) away and shallow electromagnetic measurements may be measurements that are sensitive to formation properties within a range of about 100 feet (30 meters).

Additionally, first downhole tool 138, second downhole tool 140, third downhole tool 142, and/or fourth downhole tool 144 operate and function as a multiple component resistivity tool. The multiple component resistivity tool during measurement operations may take any number of measurements of subterranean formation 104 (e.g., referring to FIGS. 1 and 2). The measurements of subterranean formation 104 may have to decouple five tensor components ($Z_{xx}$ $Z_{yy}$ $Z_{zz}$ $Z_{xz}$ $Z_{zx}$) from a set of raw measurements. As noted above, each logging tool 300 (i.e., first downhole tool 138, second downhole tool 140, third downhole tool 142, and/or fourth downhole tool 144) comprises one tilted electromagnetic transmitter 134 and two tilted electromagnetic receivers 136, two raw measurements taken by one or more logging tools 300 may be represented as:

$$Z_1 = [\sin\theta_T \cos\beta \quad \sin\theta_T \sin\beta \quad \cos\theta_T] \begin{bmatrix} Z_{xx} & 0 & Z_{xz} \\ 0 & Z_{yy} & 0 \\ Z_{zx} & 0 & Z_{zz} \end{bmatrix} \begin{bmatrix} \sin\theta_{R1}\cos\beta_{R1} \\ \sin\theta_{R1}\sin\beta_{R1} \\ \cos\theta_{R1} \end{bmatrix} \quad (1)$$

and $$Z_2 = [\sin\theta_T \cos\beta \quad \sin\theta_T \sin\beta \quad \cos\theta_T] \begin{bmatrix} Z_{xx} & 0 & Z_{xz} \\ 0 & Z_{yy} & 0 \\ Z_{zx} & 0 & Z_{zz} \end{bmatrix} \begin{bmatrix} \sin\theta_{R2}\cos\beta_{R2} \\ \sin\theta_{R2}\sin\beta_{R2} \\ \cos\theta_{R2} \end{bmatrix} \quad (2)$$

The raw measurement may be expanded as a sum of $0^{th}$, $1^{st}$, and $2^{nd}$ sinusoidal functions, expressed below as:

$Z_1 = \frac{1}{2} \sin\theta_T \sin\theta_{R1} \cos\alpha_1 [Z_{xx}-Z_{yy}]\cos 2\beta + \frac{1}{2} \sin\theta_T \sin\theta_{R1} \sin\alpha_1 [Z_{yy}-Z_{xx}]\sin 2\beta + [\sin\theta_T \cos\theta_{R1}\cdot Z_{xz} + \cos\theta_T \sin\theta_{R1} \cos\alpha_1 \cdot Z_{xx}]\cos\beta + [-\cos\theta_T \sin\theta_{R1} \sin\alpha_1 \cdot Z_{xx}]\sin\beta + [\frac{1}{2}\sin\theta_T \sin\theta_{R1} \cos\alpha_1 \cdot (Z_{xx}+Z_{yy}) + \cos\theta_T \cos\theta_{R1}\cdot Z_{zz}]$ \hfill (3)

and $Z_2 = \frac{1}{2}\sin\theta_T \sin\theta_{R2} \cos\alpha_2 [Z_{xx}-Z_{yy}]\cos 2\beta + \frac{1}{2} \sin\theta_T \sin\theta_{R2} \sin\alpha_2 [Z_{yy}-Z_{XX}]\sin 2\beta + [\sin\theta_T \cos\theta_R \cdot Z_{xz} + \cos\theta_T \sin\theta_R \cos\alpha_2 \cdot Z_{xx}]\cos\beta + [-\cos\theta_T \sin\theta_{R2} \sin\alpha_2 \cdot Z_{zx}] \sin\beta + [\frac{1}{2} \sin\theta_T \sin\theta_{R2} \cos\alpha_2 \cdot (Z_{xx}+Z_{yy}) + \cos\theta_T \cos\theta_{R2}\cdot Z_{zz}]$ \hfill (4)

where $$\beta_{R1} = \beta + \alpha_1 \quad (5)$$

and $$\beta_{R2} = \beta + \alpha_2 \quad (6)$$

Equations (1)-(4) may be arranged into a linear system as:

$$\overline{\overline{A}}_{64\times 5} \begin{bmatrix} Z_{xx} \\ Z_{yy} \\ Z_{xz} \\ Z_{zx} \\ Z_{zz} \end{bmatrix} = \begin{bmatrix} \overline{b}_{R1} \\ \overline{b}_{R2} \end{bmatrix} \quad (7)$$

Where $$\begin{bmatrix} \overline{b}_{R1} \\ \overline{b}_{R2} \end{bmatrix}$$

is the measurement from two receivers at all bins and $\overline{\overline{A}}_{64\times 5}$ may be obtained from Equations (3) and (4). In examples, the azimuth difference between the two receiver antennas:

$$\alpha_1 - \alpha_2 = \Delta \quad (8)$$

is fixed once first downhole tool 138, a second downhole tool 140, a third downhole tool 142, and/or a fourth downhole tool 144 (e.g., referring to FIGS. 1 and 2) are built.

By solving the following Equation (8) and Equation (9), $$\frac{\cos\alpha_1}{\cos\alpha_2} = \frac{\sin\theta_{R2}\cos\theta_{R1}}{\sin\theta_{R1}\cos\theta_{R2}} \quad (9)$$

The Following is Found $$\alpha_1 = \alpha^*_1 \quad (10)$$

and $$\alpha_2 = \alpha^*_2 \quad (11)$$

When the azimuth angle of a receiver antenna may be written as $$\beta_{R1} = \beta + \alpha^*_1 \quad (12)$$

and $$\beta_{R2} = \beta + \alpha^*_2 \quad (13)$$

the $\overline{\overline{A}}_{64\times 5}$ matrix may become singular. Therefore, Equation (7) may not be able to solve for all five measurement components. Specifically, the direct components $Z_{xx}$, $Z_{yy}$, $Z_{yy}$, may not be solvable. This range in azimuth angle is defined as a "blind spot."

In Examples where $$\theta_{R1} = \theta_{R2} \quad (14)$$

the blind spot corresponds to $$\alpha_1 = \alpha_2 \quad (15)$$

which is when two electromagnetic receivers 136 are symmetrical in azimuth angle with respect to electromagnetic transmitter 134. It should be noted that being symmetric is an example identified by Equation (14).

Figure 3:
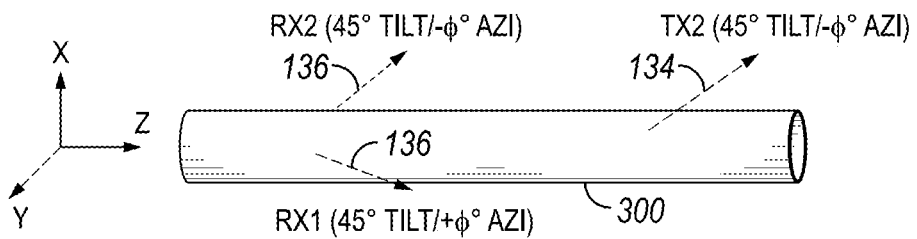
FIGS. 3 and 4 illustrate a dead spot on an electromagnetic logging tool.
Figure 4:
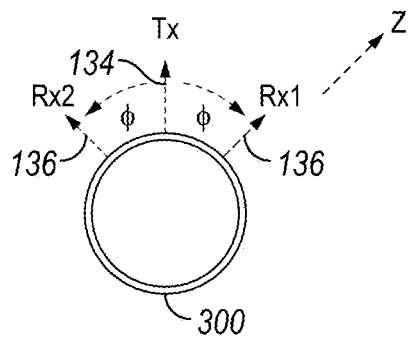

FIGS. 3 and 4 illustrate an example of logging tool 300 where electromagnetic receivers 136 and electromagnetic transmitters 134 are tilted at about 45 degree but located at different tool azimuth angles. The two electromagnetic receiver 136 are azimuthally symmetrical with respect to electromagnetic transmitter 134. This setup may form a blind spot in measurements.

Measurements taken by logging tool 300 may be processed to calibrate measurement data and remove the "blind spot." For example, with resistivity measurements there may be a DC bias in the decoupled direct components: $Z_{xx}$, $Z_{yy}$, $Z_{yy}$. Specifically, $Z_{xx}$ and $Z_{yy}$ have a negative DC bias and $Z_{zz}$ has a positive DC bias. To calibrate for the DC bias, an in-situ calibration may be performed during measurement operations, which is time-consuming and sometimes unfeasible. Additionally, it may not be feasible to decouple the direct components at a blind spot. However, two new compound signals may be decoupled as follows:

$$\cos \alpha Z_{xx} + Z_{zz} \quad (16)$$

$$\cos \alpha Z_{yy} + Z_{zz} \quad (17)$$

The new compound signals in Equations (16) and (17) may have advantages. For example, using Equations (16) and (17) along with the cross components $Z_{xz}$ and $Z_{zx}$, an inversion may be performed. The inversion results may be comparable with all five tensor components, even at a blind spot location. Additionally, because the DC bias of $Z_{xx}$ and $Z_{yy}$ is opposite to that of $Z_{zz}$. The in-situ calibration is not required for the new compound signals.

Figure 5:
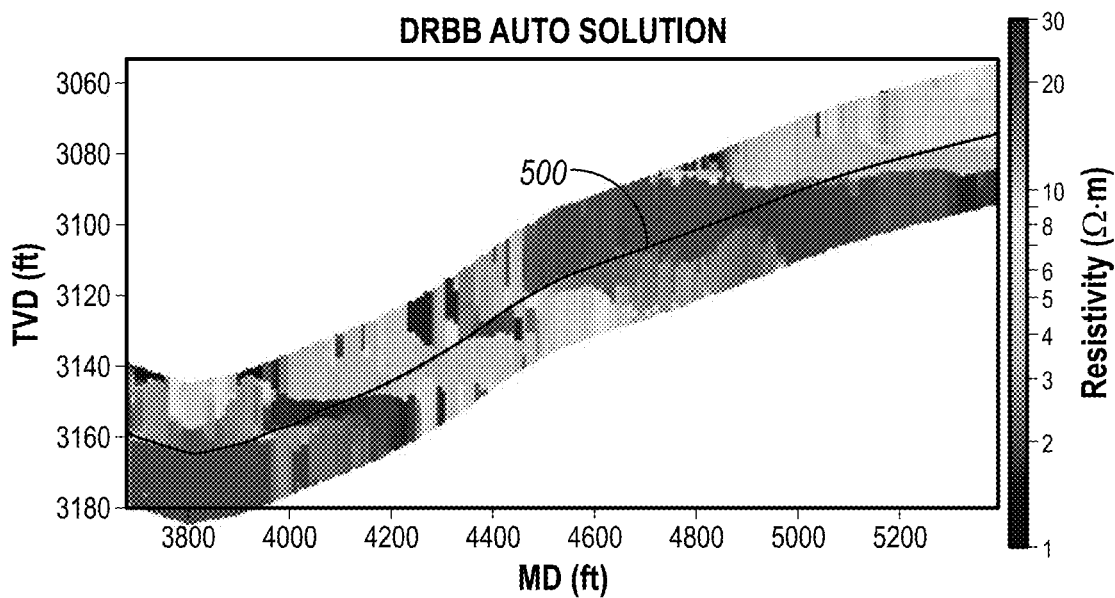
FIGS. 5-7 illustrate inversion graphs of a wellbore using synthetic data.
Figure 6:
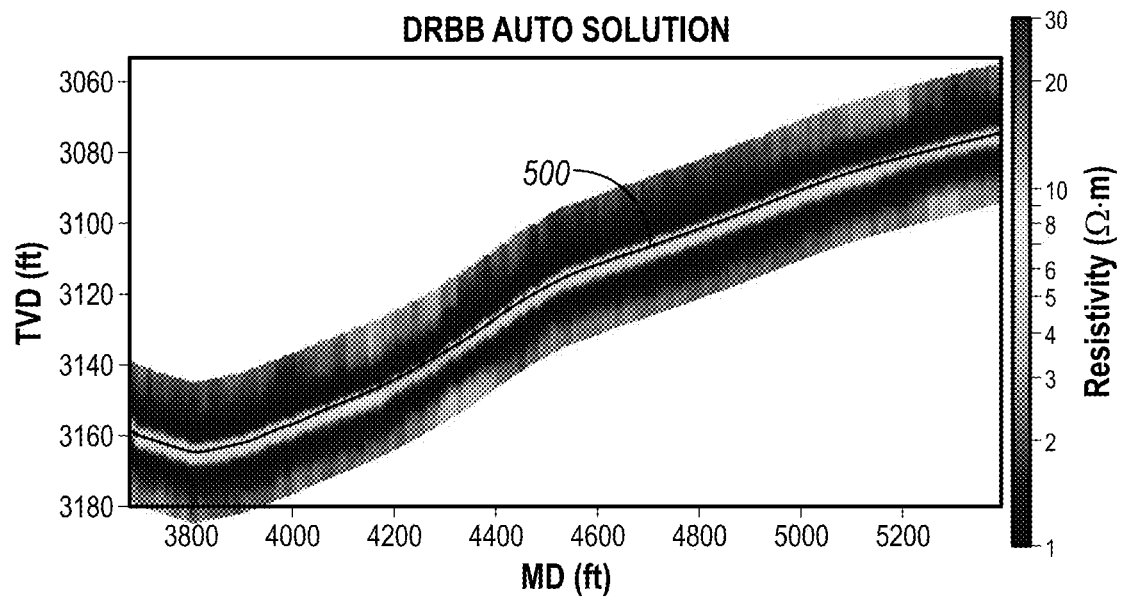
Figure 7:
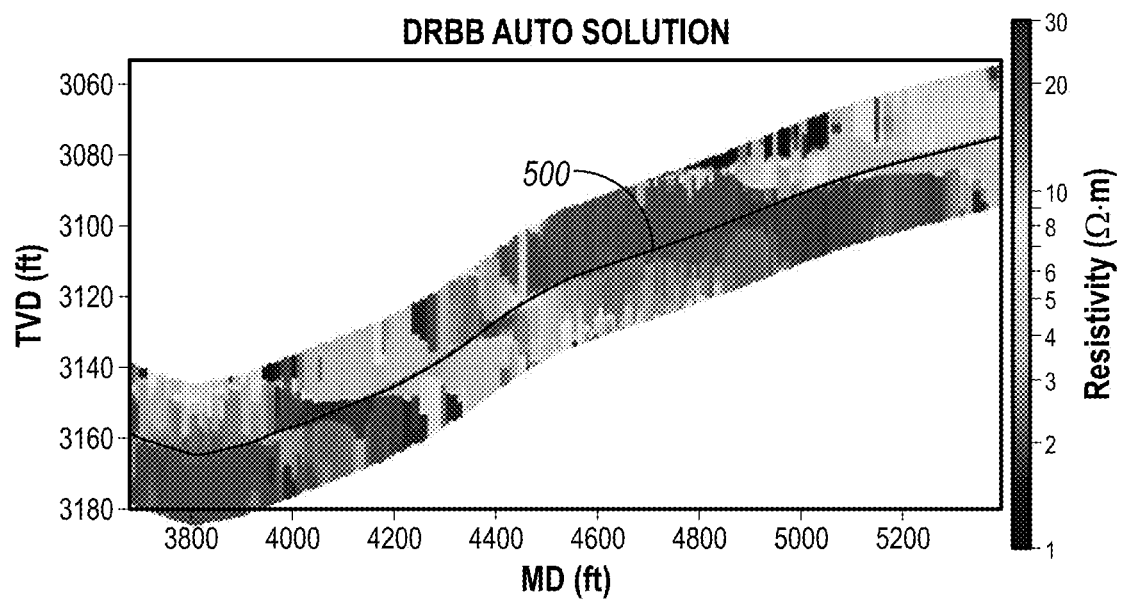

FIGS. 5-7 are graphs that illustrate implementation of the methods and systems above using synthetic data. For example, FIG. 5 illustrates a formation model, the raw measurement is generated by three dimensional (3D) electromagnetic simulation software. A 10 dB noise is added into the signal. The raw signal is then decoupled and used for inversion. Using the components $Z_{xx}$, $Z_{yy}$, $Z_{zz}$, $Z_{xz}$, $Z_{zx}$, inversion is successful outside blind spot 500 in FIG. 5, but fails at blind spot 500 in FIG. 6 because of singularity. Using the new compound signal, inversion is successful even at blind spot 500 in FIG. 7, which are similar to what is seen in FIG. 5.

Figure 8:
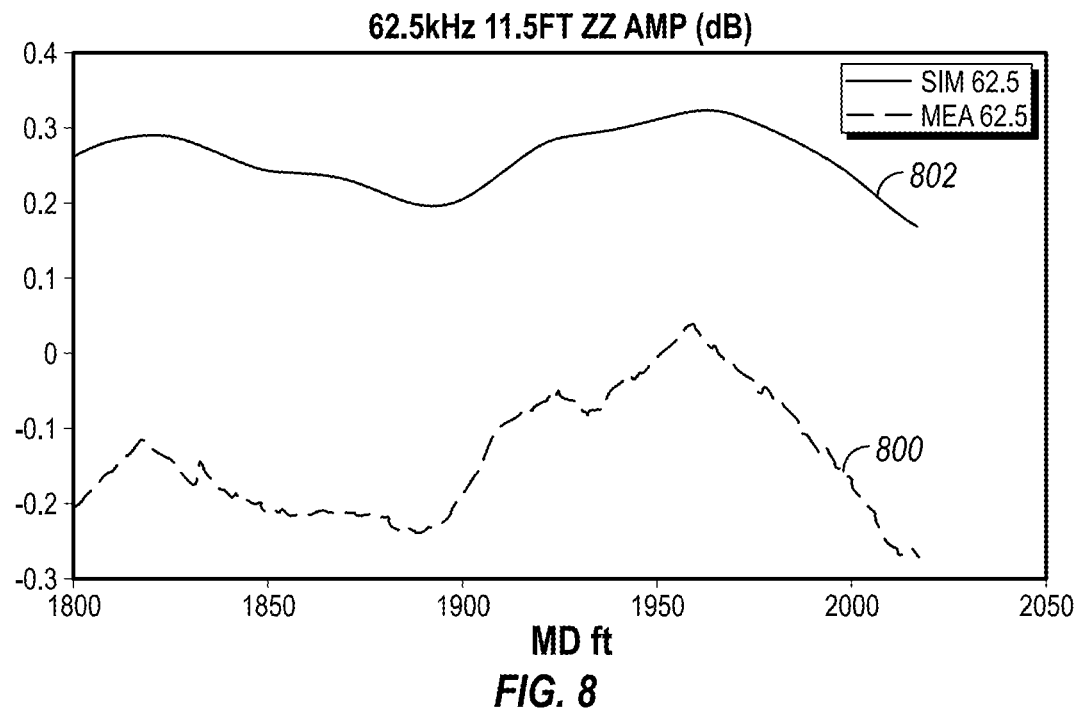
FIGS. 8-10 illustrate graphs comparing field data to synthetic data for one or more signals.
Figure 9:
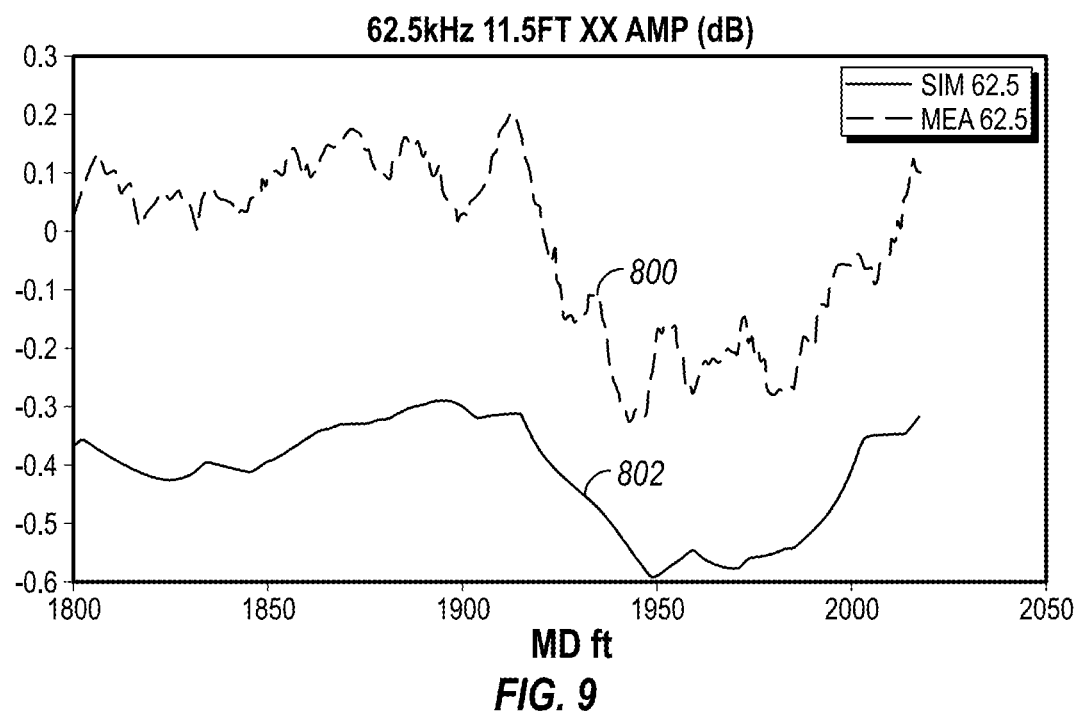
Figure 10:
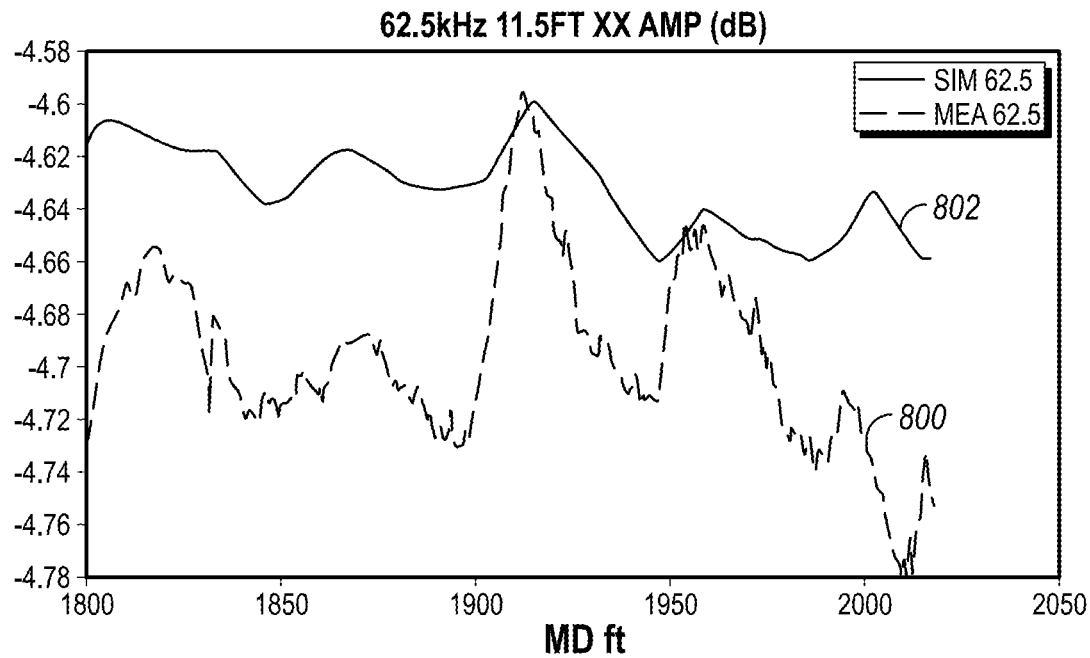

FIGS. 8-10 illustrate graphs of the methods and systems above using field data. As illustrated in the graphs a comparison of measured signals 800 and simulated signal 802 shows that there is 0.5 dB DC bias in the ZZ component as illustrated in FIG. 8, and −0.5 dB DC bias in the XX component in FIG. 9. Using the new compound signal from Equations (16) and (17), however, the simulation confirms and reflects measurements taken during operations, as shown in FIGS. 8-10.

Figure 11:
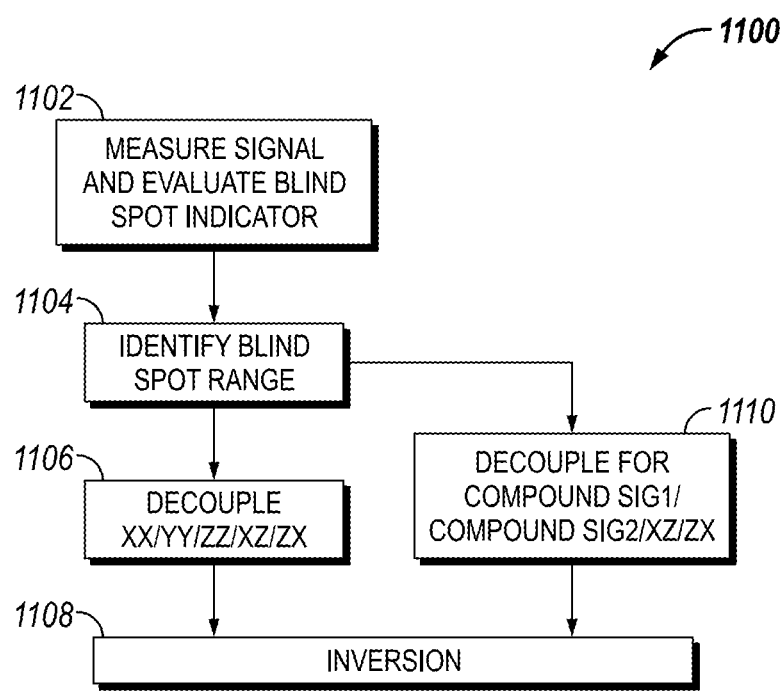
FIG. 11 is a workflow for identifying and removing a blind spot in one or more measurements.

FIG. 11 illustrates workflow 1100 for identifying and removing a blind spot in one or more measurements, as discussed above. Workflow 1100 may begin with block 1102. In block 1102 one or more measurements may be taken during a measurement operation, as discussed above, and evaluate to determine if a blind spot indicator is present. The indicator may be the condition number of matrix $\overline{A}$ from Equation (7). As one of ordinary skill in the art would know, a condition number of a matrix is the ratio of the maximum singular value to the minimum singular value.

In block 1104, the blind spot is analyzed, this is performed by identifying if the indicator is larger than a threshold, then a blind spot is confirmed. The threshold value is used to determine if the condition number is high. For example, if the condition number is too high, then a blind spot is confirmed. The threshold value may be a large positive real number, i.e., 100, which is determined and selected by personnel. If a blind spot is not confirmed, then workflow 1100 moves to block 1106, where xx/yy/zz/xz/zx are decoupled. In block 1108, the decoupled measurements may be utilized in an inversion. The inversion operates and function to utilized measured components xx/yy/zz/xz/zx to estimate one or more formation model parameters. For example, the inversion may provide an output of a 2D picture of the cross section of formation model as illustrated in FIG. 7. Referring back to block 1104, if the blind spot is confirmed, then workflow 1100 moves to block 1110, where measurements may be decouple using Equations (16) and (17) above. In block 1108, the decoupled measurements may be utilized in an inversion.

Improvements over current technology is that current technology eliminates a blind spot by adding a third electromagnetic receiver. The improvement over current technology is that the above identified methods and system only utilize two electromagnetic receivers. The method and system discussed above may include any of the various features of the compositions, methods, and system disclosed herein, including one or more of the following statements.

Statement 1. A method may comprise disposing an electromagnetic well measurement system into a wellbore. The electromagnetic well measurement system may comprise an electromagnetic transmitter and a plurality of electromagnetic receivers. The method may comprise transmitting electromagnetic fields into a formation with the electromagnetic transmitter, measuring the electromagnetic fields with the plurality of electromagnetic receivers as one or more measurements at one or more depths in the wellbore, decoupling the one or more measurements to form decoupled measurements, identifying if a blind spot is in the decoupled measurements, and performing an inversion with the decoupled measurements.

Statement 2. The method of statement 1, wherein the decoupling utilizes $\cos \alpha Z_{xx} + Z_{zz}$ and $\cos \alpha Z_{yy} Z_{zz}$.

Statement 3. The method of any preceding statements 1 or 2, wherein the decoupling identifies all five components of a tensor.

Statement 4. The method of any preceding statements 1-3, wherein the electromagnetic transmitter and each of the plurality of electromagnetic receivers are disposed along a longitudinal axis of a logging tool at one or more distances from each other.

Statement 5. The method of statement 4, wherein the electromagnetic well measurement system further comprises a plurality of logging tools.

Statement 6. The method of statement 5, wherein the plurality of logging tools are disposed on a drill string.

Statement 7. The method of statement 5, wherein the plurality of logging tools are disposed on a conveyance.

Statement 8. The method of any preceding statements 1-4, wherein the blind spot is identified with an indicator that is a condition number of a matrix.

Statement 9. The method of statement 8, wherein the blind spot is confirmed if the indicator is above a threshold.

Statement 10. The method of statement 8, wherein the blind spot is not confirmed if the indicator is below a threshold.

Statement 11. A system may comprise an electromagnetic well measurement system. The electromagnetic well measurement system may comprise an electromagnetic transmitter configured to transmit electromagnetic fields into a formation and a plurality of electromagnetic receivers configured to measure the plurality of electromagnetic receivers at one or more depths in a wellbore. The system may further comprise an information handling system in communication with the electromagnetic well measurement system and configured to decouple the one or more measurements to form decoupled measurements, identify if a blind spot is in the decoupled measurements, and perform an inversion with the decoupled measurements.

Statement 12. The system of statement 11, wherein the information handling system is configured to use $\cos \alpha Z_{xx} + Z_{zz}$ and $\cos \alpha Z_{yy} + Z_{zz}$ to decouple the one or more measurements.

Statement 13. The system of any preceding statements 11-12, wherein the information handling system is further configured to identify all five components of a tensors using the decoupled measurements.

Statement 14. The system of any preceding statements 11-13, wherein the electromagnetic transmitter and each of the plurality of electromagnetic receivers are disposed along a longitudinal axis of a logging tool at one or more distances from each other.

Statement 15. The system of statement 14, wherein the electromagnetic well measurement system further comprises a plurality of logging tools.

Statement 16. The system of statement 15, wherein the plurality of logging tools are disposed on a drill string.

Statement 17. The system of statement 15, wherein the plurality of logging tools are disposed on a conveyance.

Statement 18. The system of any preceding statements 11-14, wherein the information handling system is configured to identify the blind spot with an indicator that is a condition number of a matrix.

Statement 19. The system of statement 18, wherein the information handling system is configured to confirm the blind spot if the indicator is above a threshold.

Statement 20. The system of statement 18, wherein the information handling system ins configured to not confirm the blind spot if the indicator is below a threshold.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
disposing an electromagnetic well measurement system into a wellbore, wherein the electromagnetic well measurement system comprises:
an electromagnetic transmitter; and
a plurality of electromagnetic receivers;
transmitting electromagnetic fields into a formation with the electromagnetic transmitter;
measuring the electromagnetic fields with the plurality of electromagnetic receivers as one or more measurements at one or more depths in the wellbore;
decoupling the one or more measurements to form decoupled measurements;
identifying if a blind spot is in the decoupled measurements; and
performing an inversion with the decoupled measurements.

2. The method of claim 1, wherein the decoupling utilizes $\cos \alpha Z_{xx} + Z_{zz}$ and $\cos \alpha Z_{yy} + Z_{zz}$, wherein $Z_{xx}$ is a direct component along an x-axis of a tensor, wherein $Z_{yy}$ is a direct component along a y-axis of a tensor, and wherein $Z_{zz}$ is a direct component along a z-axis of a tensor.

3. The method of claim 1, wherein the decoupling identifies all five components of a tensor.

4. The method of claim 1, wherein the electromagnetic transmitter and each of the plurality of electromagnetic receivers are disposed along a longitudinal axis of a logging tool at one or more distances from each other.

5. The method of claim 4, wherein the electromagnetic well measurement system further comprises a plurality of logging tools.

6. The method of claim 5, wherein the plurality of logging tools are disposed on a drill string.

7. The method of claim 5, wherein the plurality of logging tools are disposed on a conveyance.

8. The method of claim 1, wherein the blind spot is identified with an indicator that is a condition number of a matrix.

9. The method of claim 8, wherein the blind spot is confirmed if the indicator is above a threshold.

10. The method of claim 8, wherein the blind spot is not confirmed if the indicator is below a threshold.

11. A system comprising:
electromagnetic well measurement system comprises:
an electromagnetic transmitter configured to transmit electromagnetic fields into a formation; and
a plurality of electromagnetic receivers configured to measure the plurality of electromagnetic receivers at one or more depths in a wellbore; and an information handling system in communication with the electromagnetic well measurement system and configured to:
  decouple the one or more measurements to form decoupled measurements;
  identify if a blind spot is in the decoupled measurements; and
  perform an inversion with the decoupled measurements.

12. The system of claim 11, wherein the information handling system is configured to use $\cos \alpha Z_{xx} + Z_{zz}$ and $\cos \alpha Z_{yy} + Z_{zz}$ to decouple the one or more measurements, wherein $Z_{xx}$ is a direct component along an x-axis of a tensor, wherein $Z_{yy}$ is a direct component along a y-axis of a tensor, wherein $Z_{zz}$ is a direct component along a z-axis of a tensor.

13. The system of claim 11, wherein the information handling system is further configured to identify all five components of a tensors using the decoupled measurements.

14. The system of claim 11, wherein the electromagnetic transmitter and each of the plurality of electromagnetic receivers are disposed along a longitudinal axis of a logging tool at one or more distances from each other.

15. The system of claim 14, wherein the electromagnetic well measurement system further comprises a plurality of logging tools.

16. The system of claim 15, wherein the plurality of logging tools are disposed on a drill string.

17. The system of claim 15, wherein the plurality of logging tools are disposed on a conveyance.

18. The system of claim 11, wherein the information handling system is configured to identify the blind spot with an indicator that is a condition number of a matrix.

19. The system of claim 18, wherein the information handling system is configured to confirm the blind spot if the indicator is above a threshold.

20. The system of claim 18, wherein the information handling system is configured to not confirm the blind spot if the indicator is below a threshold.

* * * * *